(12) United States Patent
Murtha

(10) Patent No.: US 9,194,607 B2
(45) Date of Patent: Nov. 24, 2015

(54) SOLAR CONCENTRATING WEDGE, COMPACT AND VENTILATED

(71) Applicant: R. Michael Murtha, Oxnard, CA (US)

(72) Inventor: R. Michael Murtha, Oxnard, CA (US)

( * ) Notice: Subject to any disclaimer, the term of this patent is extended or adjusted under 35 U.S.C. 154(b) by 260 days.

(21) Appl. No.: 13/815,633

(22) Filed: Mar. 13, 2013

(65) Prior Publication Data

US 2014/0261389 A1    Sep. 18, 2014

(51) Int. Cl.
*F24J 2/10*    (2006.01)
*F24J 2/06*    (2006.01)
*F24J 2/04*    (2006.01)

(52) U.S. Cl.
CPC .......... *F24J 2/062* (2013.01); *F24J 2002/0405* (2013.01); *Y02E 10/44* (2013.01)

(58) Field of Classification Search
CPC ............................ F24J 2/062; F24J 2002/0405
See application file for complete search history.

(56) References Cited

U.S. PATENT DOCUMENTS

| | | | | |
|---|---|---|---|---|
| 3,884,217 A * | 5/1975 | Wartes | ........................... | 126/571 |
| 4,022,186 A * | 5/1977 | Northrup, Jr. | ............... | F24J 2/06 126/683 |
| 4,074,704 A * | 2/1978 | Gellert | ..................... | F24J 2/062 126/683 |
| 4,344,417 A * | 8/1982 | Malecek | ................... | F24J 2/062 126/687 |
| 4,377,154 A * | 3/1983 | Meckler | ..................... | F24J 2/06 126/603 |
| 4,440,155 A * | 4/1984 | Maloof | ..................... | F24J 2/062 126/570 |
| 4,541,416 A * | 9/1985 | Leininger | .................. | F24J 2/05 126/646 |
| 6,971,756 B2 * | 12/2005 | Vasylyev | .................... | F24J 2/14 126/692 |
| 7,559,672 B1 * | 7/2009 | Parkyn | ................... | A47B 97/00 362/127 |
| 7,873,257 B2 * | 1/2011 | Morgan | .................. | F21S 11/00 126/685 |
| 8,333,480 B1 * | 12/2012 | Murtha | ........................ | 359/853 |
| 2007/0227581 A1 * | 10/2007 | Chen et al. | ..................... | 136/246 |
| 2011/0197968 A1 * | 8/2011 | Montgomery | ................. | 136/259 |

* cited by examiner

*Primary Examiner* — Charlie Y Peng

(57) ABSTRACT

Solar concentrating wedge can potentially deliver twice the output of a CPC trough. The wedge uses a new optic that turns light sharply allowing the collector to have a very compact profile. In this way, the focal zone is made shorter and hotter for solar thermal applications and the maximum flux density is doubled for photovoltaics. The collection optics are self-cooling. A simple and sturdy non-tracking frame ensures that collected light will follow the intended path to the absorber.

1 Claim, 3 Drawing Sheets

SOLAR CONCENTRATING WEDGE, COMPACT AND VENTILATED

BACKGROUND OF THE INVENTION

This invention relates to the collection of sunlight and specifically to improvements in a stationary solar concentrating collector.

Practical stationary solar concentrators include the well known compound parabolic concentrator (CPC) trough and the linear wedge. These collectors focus light onto an absorber without following the sun, thus eliminating the expense of rotating machinery.

The CPC is elegantly simple, though very tall compared to its width. CPC height poses an engineering challenge since, if the collector is made larger to gather more light, its reflective wall cross section must be increased disproportionately to overcome the greater effects of gravity and wind loading. By comparison, the wedge is short and wide, a profile that is stable and easily scaled-out to collect a larger area of sunlight. Solar Concentrating Wedge, U.S. Pat. No. 8,333,480, Murtha, uses advanced collection optics to achieve the low profile.

SUMMARY OF THE INVENTION

The primary object of this invention is to introduce a linear wedge that has an unexpectedly high geometric concentration ratio.

Accordingly, the primary object is accomplished in the following manner: modified collection optics are placed in an stepped arrangement that allows the new wedge to become ultra-compact, resulting in a much shorter and hotter focus.

Another object is to present a compact wedge that has self-cooling collection optics.

Other objects and advantages will become apparent from the following detailed description and accompanying drawings.

DESCRIPTION OF THE INVENTION

Figure 1:
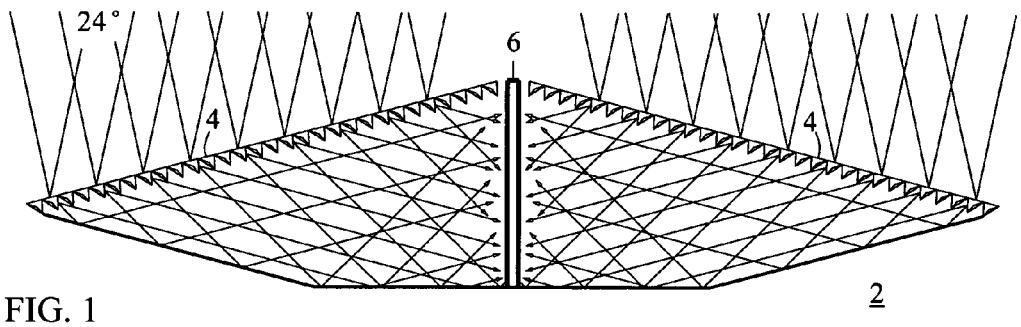
FIG. 1 is an end view of a prior art wedge.

Turning now to FIG. 1, there is shown a prior art solar concentrating wedge 2 (U.S. Pat. No. 8,333,480) with a 24° acceptance angle. Collection optic 4 is a flat array of abutting prisms that directs light into the wedge toward the absorber. Hollow fin-type absorber 6 is irradiated on both sides for a geometric concentration ratio of 4.5×. It should be noted that 4.5× is also the concentration ratio that a truncated CPC will produce, having the same collector width, the same fin absorber height and a 24° acceptance angle.

Figure 2:
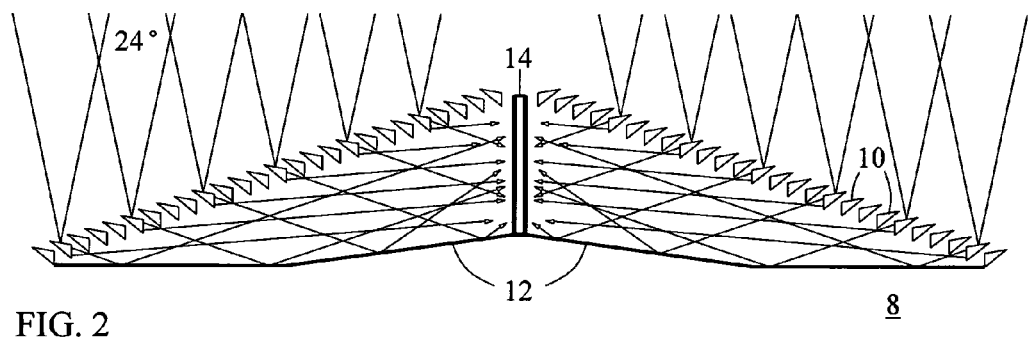
FIG. 2 is an end view of a compact wedge of the present invention.

In FIG. 2, compact wedge 8 of the present invention, is shown for the first time. Both sides of the collector are identical, where one side has been turned 180° in relation to the other. The hollow collector is bounded by an inclined row of stepped prisms 10 on top and compound reflectors 12 on the collector bottom. In the focal zone, fin-type absorber 14 extends vertically from the collector apex to the collector bottom. FIG. 1 and FIG. 2 collectors are the same width, however absorber 14 is a third shorter than the absorber in FIG. 1, which increases the geometric concentration ratio to 6.8×.

Figure 3:
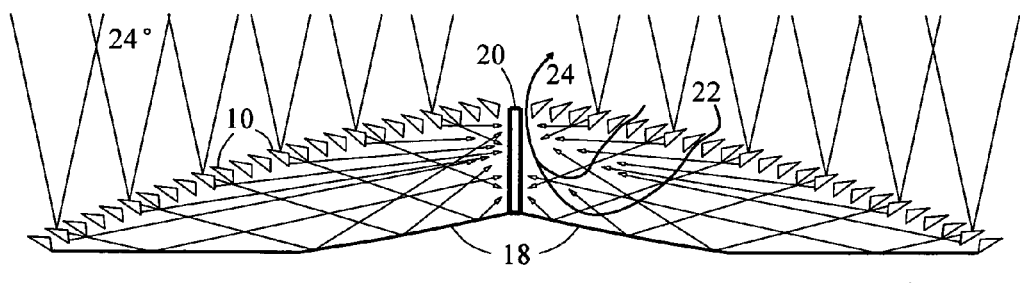
FIG. 3 is an end view of the ultra-compact wedge.

In FIG. 3, ultra-compact wedge 16 is shown for the first time. Upwardly curved bottom reflectors 18 reduce the size of the focal zone. Stepped prisms 10 are arrayed in an arch and each individual prism is rotated slightly so that light will have a clear path to absorber 20. Absorber 20 is half the height of the FIG. 1 (and CPC) absorber, producing a concentration of 9×. With this new level of heat production, it is fortunate that the collection optics are self-cooling. Heat from the absorber creates a convection current that pulls cool air 22 through the gaps between prisms. The air circulates, picks up momentum and leaves through the collector apex as warm air 24. All of the prisms are passively cooled by air 22.

FIGS. 1, 2 and 3 are drawn to scale. The reader can verify each geometric concentration ratio by measuring the collector from tip to tip and dividing by the absorber height.

Solar thermal: The value of the collector is that pure water, for human consumption and agriculture, can be obtained from any brackish water source. Solar thermal energy boils the water which becomes steam and the steam condensate is captured as purified water. Concentrated light accelerates the distillation process. From a different perspective, solar generated steam can also be used to power a steam engine without air pollution. For either process, it is the collector surface area that will determine the volume of steam produced and the steam can be plentiful since the wedge is scalable.

Concentrating photovoltaics: The compact wedge should be useful for illuminating solar cells. Flux density is high and the delivery angle from the collection optics to the cells is direct compared to the CPC.

Figure 4:
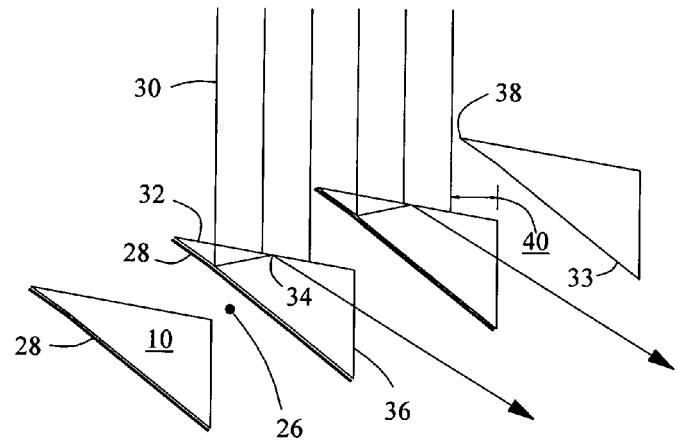
FIG. 4 is an end view of the stepped collection optics.

In FIG. 4 the collection optics are arrayed at an incline and each prism is separated from its neighbor by an air gap 26. Each optic is an assembly of a substantially triangular clear acrylic or glass prism 10 and aluminum sheet reflector 28. Sheet 28 provides the initial light bounce, but each reflection after that is a total internal reflection. Prism 10 can be a single part or it can be made of several pieces that are held together with index matching glue.

Incident ray 30 enters through prism inlet surface 32. Ray 30 transmits prism bottom surface 33 and is then sent up diagonally by reflector 28 for a total internal reflection 34 at a predetermined angle before exiting the prism large end outlet surface 36. Each large end 36 is overshadowed 40 by a cantilever pointed end 38 of the next higher prism, so that light is not lost through gap 26.

Figure 5:
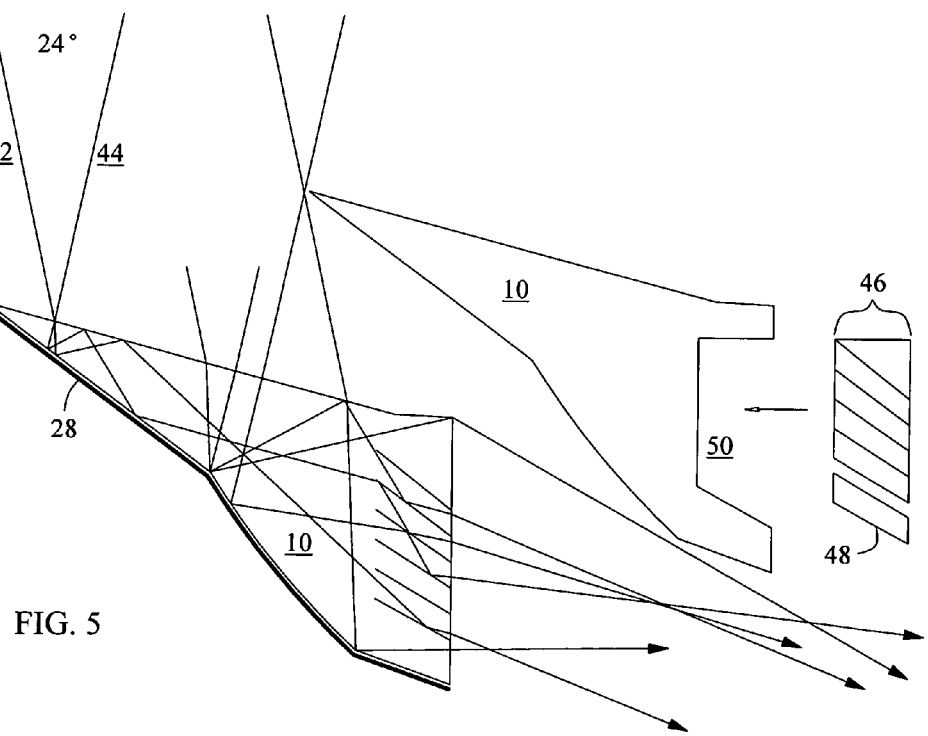
FIG. 5 is an end view of the preferred embodiment collection optics.

A preferred embodiment of the collection optic is shown in FIG. 5. In transverse cross-section, prism 10 has the general appearance of a cornucopia, having a pointed end and a large end. Reflector 28 is disposed adjacent the prism bottom surface. The optic combines the acceptance angle of a prism and the directionality of a reflector, collecting all light between equinox ray 42 and solstice ray 44 and having that light cleanly turn-the-corner into the wedge. The optic has a 24° acceptance angle that collects sunlight three months before and three months after summer solstice, the brightest six months in the northern hemisphere.

In this embodiment, the prism incorporates a total internal reflection comb 46 which straightens out some of the rays before they exit the prism. Comb 46 is a stack of individual acrylic blocks 48 that are designed to maintain thin air spaces between the blocks so that total internal reflection can occur. The blocks are inserted into recess 50 that has been molded into prism 10. Long sealing beads of clear silicone (not shown) will keep moisture out of the air spaces while maintaining the block positions.

Figure 6:
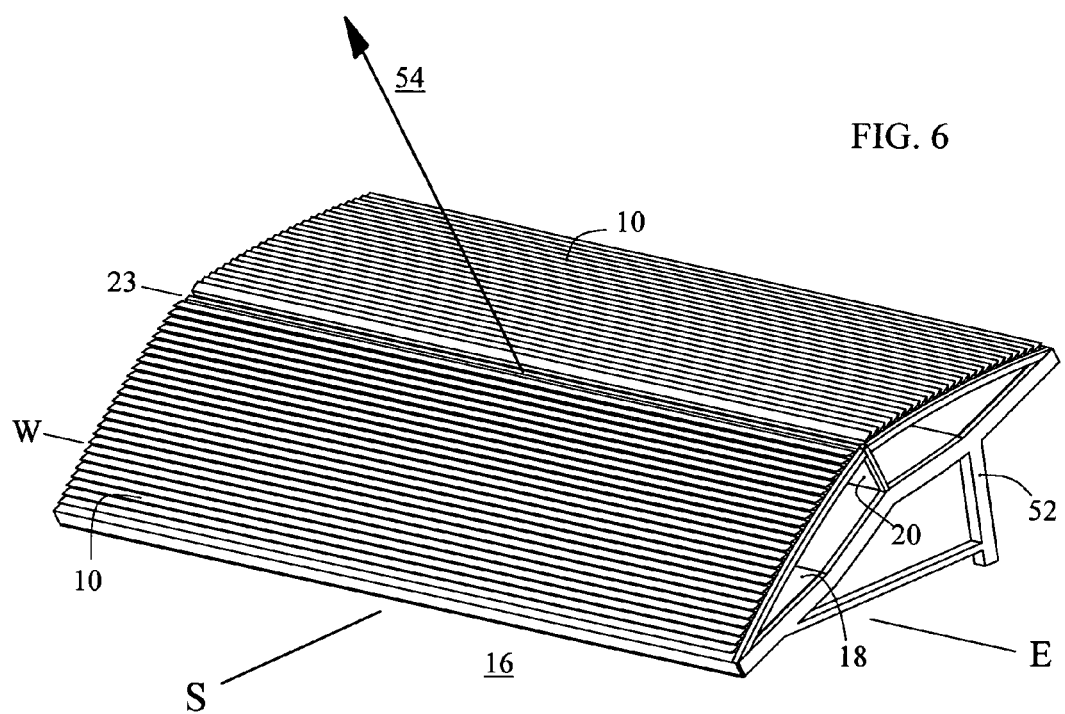
FIG. 6 is a isometric view of the ultra-compact wedge and frame.

FIG. 6 is a perspective view of the FIG. 3 ultra-compact wedge 16. Stationary frame 52 is constructed of square tubular steel. Identical optics 10 are used on both sides of the collector. Bottom reflector 18 and absorber 20 run the full east-west length of the collector. The top of absorber 20 is nearly coincident with wedge apex 23. For any given latitude, the collector should be pointed 54 half way between the solstice and equinox positions of the sun.

SUMMARY

The reader has been shown a solar concentrating wedge that is potentially more powerful than a CPC trough. The wedge uses new, highly effective optics for light collection. The stationary collector has no moving parts and therefore fewer maintenance and labor costs. Collector scalability allows lower manufacturing costs overall. There has always been a need for a cost effective non-tracking solar concentrator and now the compact wedge has all the right features.

I claim:

1. A stationary solar concentrating collector comprising:
a) a linear frame;
b) a linear fin-type absorber;
c) a plurality of individual linear prisms, each said prism fixed about its longitudinal axis, each prism in transverse cross section having three sides, said sides including an inlet surface, a bottom surface and an outlet end, said prism outlet end extending from said inlet surface to said bottom surface, the bottom surface and the inlet surface converging to a prism pointed end, said pointed end cantilevered over the inlet surface and outlet end of a lower neighbor prism to provide full light collection coverage, the outlet end formed to include a comb of total internal reflection surfaces for straightening extreme rays that would otherwise be lost, said comb surfaces oriented substantially parallel to the bottom surface, whereby light within the prism acceptance angle enters the inlet surface, reflects at the bottom surface, reflects at the inlet surface, reflects at a comb surface and exits the prism outlet end, the light traveling in a comb-limited delivery angle to said absorber;
d) a plurality of linear reflectors, each said reflector disposed adjacent the bottom surface of each prism;
e) a linear collector bottom reflector.

* * * * *